(12) United States Patent
Ogawa et al.

(10) Patent No.: US 12,384,596 B2
(45) Date of Patent: Aug. 12, 2025

(54) CONTAINER AND CONTAINER ASSEMBLY

(71) Applicant: AICELLO CORPORATION, Toyohashi (JP)

(72) Inventors: Tetsuro Ogawa, Toyohashi (JP); Takashi Yamamoto, Toyohashi (JP)

(73) Assignee: AICELLO CORPORATION, Toyohashi (JP)

( * ) Notice: Subject to any disclaimer, the term of this patent is extended or adjusted under 35 U.S.C. 154(b) by 70 days.

(21) Appl. No.: 18/561,003

(22) PCT Filed: Mar. 31, 2022

(86) PCT No.: PCT/JP2022/016522
§ 371 (c)(1),
(2) Date: Nov. 15, 2023

(87) PCT Pub. No.: WO2022/244527
PCT Pub. Date: Nov. 24, 2022

(65) Prior Publication Data
US 2024/0367857 A1    Nov. 7, 2024

(30) Foreign Application Priority Data
May 17, 2021    (JP) ................ 2021-083228

(51) Int. Cl.
*B65D 23/00* (2006.01)
*B65D 1/02* (2006.01)
(Continued)

(52) U.S. Cl.
CPC ............ *B65D 23/001* (2013.01); *B65D 1/02* (2013.01); *B65D 25/24* (2013.01)

(58) Field of Classification Search
CPC ...... B65D 1/02; B65D 1/0284; B65D 23/001; B65D 23/0878; B65D 23/12; B65D 25/24; Y10T 29/49876
(Continued)

(56) References Cited

U.S. PATENT DOCUMENTS

| | | | | |
|---|---|---|---|---|
| 845,777 A | * | 3/1907 | Grossman | B65D 23/001 |
| | | | | 220/630 |
| 860,316 A | * | 7/1907 | Nash | B65D 23/001 |
| | | | | 215/12.1 |

(Continued)

FOREIGN PATENT DOCUMENTS

| | | |
|---|---|---|
| CN | 102050248 A | 5/2011 |
| CN | 107848670 A | 3/2018 |

(Continued)

OTHER PUBLICATIONS

Jun. 7, 2022 International Search Report issued in International Patent Application No. PCT/JP2022/016522.

(Continued)

*Primary Examiner* — Gideon R Weinerth
(74) *Attorney, Agent, or Firm* — Oliff PLC

(57) ABSTRACT

A container and container assembly can suppress container deformation, without use of liquid feeder container supports, even when internal container pressure becomes high during pressure feed of a liquid using high-pressure gas, whereby performing stably liquid feed. The container and container assembly have high versatility and can be used in a liquid feeder having no container support. A container has an approximately cylindrical main body portion wherein the main body portion includes a cylindrical mouth opening at one end, a stepped portion extending from the other end. The container has a reduced diameter, and round bottom portion extending from and bulging away from the stepped portion. Multiple concave portions engage with support base claw (Continued)

portions enabling the container to stand by itself are formed at the stepped portion and recessed at non-overlapping positions with a series of parting lines extending through the main body, stepped, and round bottom portions.

6 Claims, 4 Drawing Sheets

(51) Int. Cl.
  *B65D 25/20* (2006.01)
  *B65D 25/24* (2006.01)
(58) Field of Classification Search
  USPC ........ 215/395, 372, 383, 384, 376; 220/605, 220/630
  See application file for complete search history.

(56) References Cited

U.S. PATENT DOCUMENTS

| | | | | |
|---|---|---|---|---|
| 2,837,245 A * | 6/1958 | Grebowiec | ............ | B65D 83/38 222/402.1 |
| 2,905,351 A * | 9/1959 | Lerner | ................ | A47G 23/0216 220/605 |
| 3,722,725 A * | 3/1973 | Khetani | ............... | B65D 23/001 220/605 |
| 3,847,494 A * | 11/1974 | Franklin | ............ | A45D 40/0068 403/345 |
| 3,927,782 A * | 12/1975 | Edwards | ............. | B65D 23/001 215/10 |
| 3,948,404 A * | 4/1976 | Collins | ................. | B65D 25/24 220/605 |
| 4,138,026 A * | 2/1979 | Conklin | ................ | B29C 63/423 215/12.2 |
| 4,241,839 A * | 12/1980 | Alberghini | ........... | B65D 23/001 248/688 |
| 4,326,638 A * | 4/1982 | Nickel | ................. | B65D 23/001 215/12.1 |
| 4,463,860 A * | 8/1984 | Yoshino | ............... | B65D 23/001 220/605 |
| 4,881,666 A * | 11/1989 | Tullman | ................ | B65D 23/02 222/548 |
| 5,662,241 A * | 9/1997 | Sorensen | ............. | B65D 81/365 220/630 |
| 6,405,675 B1 * | 6/2002 | Mills | ........................ | A01K 7/00 215/DIG. 7 |
| 8,439,223 B2 * | 5/2013 | Smith | ................... | B65D 23/001 220/636 |
| 9,061,795 B2 * | 6/2015 | Girardot | .............. | B65D 23/001 |
| 2006/0177399 A1 * | 8/2006 | Jourdan | ................... | A61Q 5/06 424/70.1 |
| 2008/0210699 A1 * | 9/2008 | Esteve | ................. | B65D 1/0276 220/737 |
| 2009/0184116 A1 * | 7/2009 | Laske | ...................... | A01K 7/00 220/4.28 |
| 2011/0049167 A1 * | 3/2011 | Martin | ................. | B65D 23/001 220/630 |
| 2013/0062302 A1 * | 3/2013 | Otero | .................... | B65D 11/04 215/12.1 |
| 2018/0215512 A1 | 8/2018 | Toh | | |
| 2018/0296013 A1 * | 10/2018 | Frei | ...................... | A47G 23/0241 |
| 2024/0367857 A1 * | 11/2024 | Ogawa | ..................... | B65D 1/02 |

FOREIGN PATENT DOCUMENTS

| | | | | |
|---|---|---|---|---|
| CN | 211495203 U | | 9/2020 | |
| FR | 2357437 A1 * | | 7/1976 | ............ B65D 81/20 |
| JP | S57-26337 U | | 2/1982 | |
| JP | S58-76899 U | | 5/1983 | |
| JP | H01-147983 U | | 10/1989 | |
| JP | H07-2233 U | | 1/1995 | |
| JP | 2000-010390 A | | 1/2000 | |
| JP | 2011-098736 A | | 5/2011 | |
| JP | 2019-001508 A | | 1/2019 | |
| JP | 2020-196537 A | | 12/2020 | |

OTHER PUBLICATIONS

Jun. 7, 2022 Written Opinion issued in International Patent Application No. PCT/JP2022/016522.

Mar. 26, 2025 Extended European Search Report issued in European Application No. 22804443.4.

Jun. 19, 2025 Office Action issued in Chinese Patent Application No. 202280036120.X.

* cited by examiner (a)

(b)

(c)

(d)

(a)

(b)

CONTAINER AND CONTAINER ASSEMBLY

TECHNICAL FIELD

The present invention relates to a container for containing a liquid and to a container assembly including this container.

BACKGROUND OF THE ART

Liquids such as material liquids for foods and high-purity chemical solutions for industrial use (for example, photoresist and cleaning agent used in manufacture of semiconductors and manufacture of liquid crystal displays) are contained in containers while their high purities are maintained so as to prevent contamination by foreign substances or deterioration of the liquids. These liquids are stored and transported while being contained in the containers. Also, a container containing a liquid is set into a liquid feeder, and the liquid is discharged from the container and is used.

In general, the bottom surface of such a container is formed to be flat so as to enable the container to stand by itself. A method for discharging a liquid by means of pressure feed is a known technique. In this method, a liquid feed pipe and a gas supply pipe are inserted into a container, and a gas is fed into the container through the gas supply pipe so as to increase the internal pressure of the container, thereby feeding the liquid into the liquid feed pipe, whereby the liquid is discharged from the container. In this case, a high-pressure gas (for example, 100 to 200 kPa) is frequently used so as to pressure-feed a liquid which is high in viscosity and does not flow easily. In the case of a generally known container having a flat bottom surface, when the pressure inside the container increases due to supply of the high-pressure gas, the bottom surface may bulge and deform, and the container may tilt. When the amount of the liquid remaining in the container decreases, the end of the liquid feed pipe becomes unable to reach the liquid, because of the deformation of the bottom surface and the tilting of the container, possibly resulting in the inability to discharge from the container a portion of the liquid contained in the container.

Patent Document 1 describes a container having a hemispherical bottom surface and a support base (cradle) for enabling the container to stand by itself. As a result of engagement between a concave groove formed on the outer surface of a circumferential wall of the container and being continuous in the circumferential direction and convex portions provided on the inner surface of a circumferential wall of the support base, the container and the support base are fitted together. Since the bottom surface of the container is hemispherical, the internal pressure of the container generated as a result of supply of the above-described high-pressure gas acts equally on the bottom surface. Since the entire bottom surface extends downward due to the pressure of the high-pressure gas, the concave groove follows this extension and extends in the manner of a helical spring. Consequently, the concave groove pushes out the convex portions of the cradle and cannot maintain the engagement with the convex portions. As a result, the container comes off the support base and falls over, and it becomes unable to stably pressure-feed the liquid.

Patent Document 2 describes a liquid container which includes a container main body having a round bottom and a support base which has a penetrating portion at its center and which supports the container main body, thereby enabling the container main body to stand by itself. A circumferential groove for engagement with the support base is formed on the container main body. When this liquid container is used, it is set into a liquid feeder which includes a pedestal having a protrusion which is fitted into the penetrating portion of the support base and comes into contact with the round bottom, and a pressing member which presses an upper end of the container main body. Since the container main body is sandwiched between container supports provided in the liquid feeder, such as the protrusion of the pedestal and the pressing member, even when the internal pressure of the container main body increases, the circumferential groove does not extend and the container main body does not come off the support base. However, in the case of the liquid container described in Patent Document 2, since the liquid feeder having container supports such as the protrusion and the pressing member is indispensable to pressure-feed the liquid within the container by the high-pressure gas, limitations are imposed on liquid feeders into which the container can be set, and therefore, the liquid container described in Patent Document 2 is poor in versatility.

PATENT DOCUMENTS

[Patent Document 1] JPS58-76899U
[Patent Document 2] JP2011-098736A

SUMMARY OF THE INVENTION

Problems to be Solved by the Invention

The present invention has been accomplished so as to solve the above-described problems, and an object of the present invention is to provide a container and a container assembly which can remarkably suppress deformation of the container, without use of container supports of a liquid feeder, even when the internal pressure of the container becomes high at the time of pressure feed of a liquid by using a high-pressure gas, whereby stable liquid feed can be performed. The container and the container assembly have a high degree of versatility such that, for their use, they can be set into a liquid feeder having no container support.

Means for Solving Problems

A container of the present invention which has been accomplished so as to achieve the above-described object is a container used to contain a liquid and to pressure-feed the liquid, comprising an approximately cylindrical main body portion, a cylindrical mouth opening at one end of the main body portion, a stepped portion continuously extending from the other end of the main body portion and having a reduced diameter, and a round bottom portion continuously extending from the stepped portion and bulging away from the stepped portion, wherein a plurality of concave portions for engagement with claw portions of a support base which enables the container to stand by itself are intermittently formed at the stepped portion, the concave portions being recessed at positions which do not overlap with a series of parting lines extending through the main body portion, the stepped portion, and the round bottom portion, and wherein each of the concave portions has an approximately elliptical shape elongated in a circumferential direction of the main body portion, and the total length of the plurality of concave portions in the circumferential direction accounts for 20 to 50% of the largest peripheral length of the main body portion.

In the container, the concave portions may be provided, symmetrically with respect to the parting lines, at four locations each being an angle of 20 to 45° away from the corresponding parting line or at six locations separated from one another by an angle of 60°, the angles being those about a center axis of the main body portion.

In a container assembly of the present invention, the main body portion of each of the above-described containers has a trunk portion and a neck portion which is located closer to the cylindrical mouth and whose diameter is smaller than that of the trunk portion, and a handle is fitted and/or screwed onto an outer surface of the neck portion.

The container assembly includes any of the above-described containers and a support base which has an opening into which the round bottom portion is fitted and claw portions which extend from a circumferential edge of the opening and are engaged with the concave portions, whereby the support base enables the container to stand by itself.

Effects of the Invention

According to the container and the container assembly of the present invention, even when the internal pressure of the container becomes high at the time of pressure-feed of the liquid, the container does not extend or deform due to pressure, because the concave portions for engagement with the claw portions of the support base are intermittently formed at particular positions. Therefore, the support base does not come off the container, and therefore, pressure-feed of the liquid can be performed stably.

Also, since the container itself does not extend in the direction of its center axis at the time of pressure feed of the liquid, container supports for suppressing deformation of the container are not required to be provided in liquid feeders. Therefore, the container and the container assembly can cope with various types of liquid feeders and have a high degree of versatility.

MODE FOR CARRYING OUT THE INVENTION

Hereunder, embodiments for practicing the present invention will be explained in detail, but the scope of the present invention is not limited to these embodiments.

Figure 1:
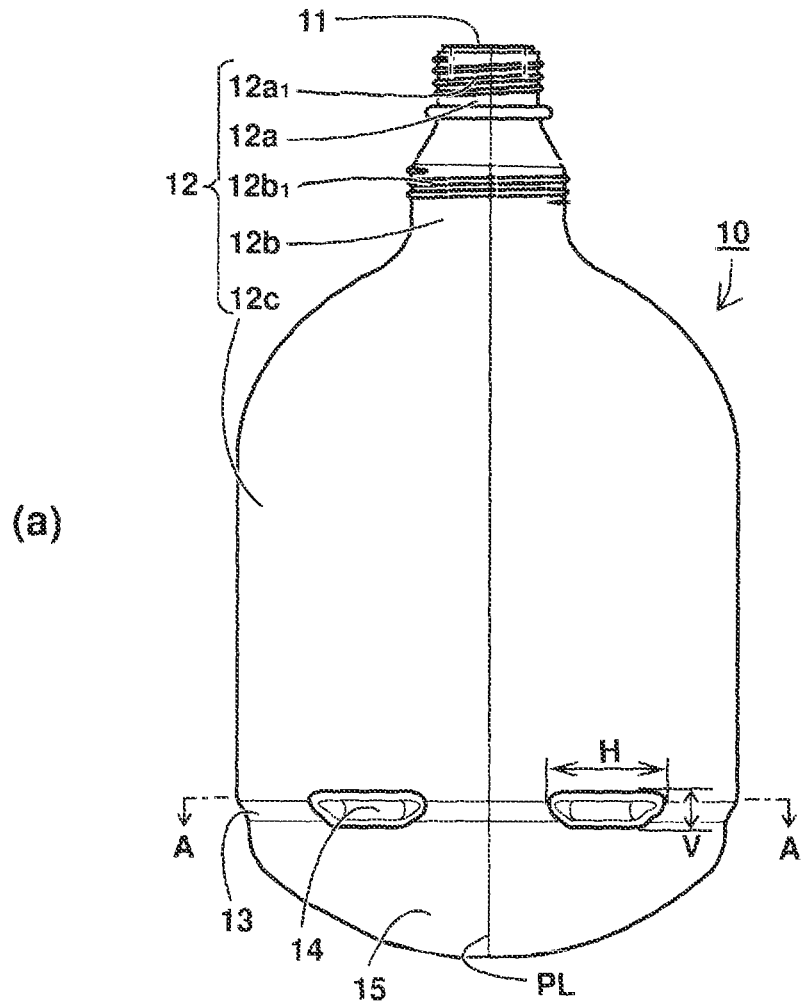
FIG. 1 shows a front view of a container to which the present invention is applied and an end view taken along line A-A and viewed in the arrow direction.
Figure 1:
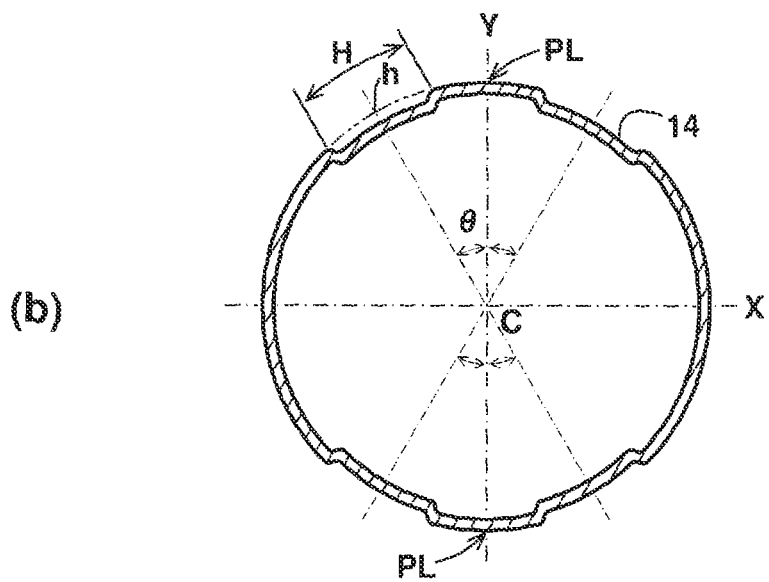

FIG. 1 shows one embodiment of a container 10 of the present invention. FIG. 1(a) is a front view of the container 10, and FIG. 1(b) is an end view taken along line A-A and viewed in the arrow direction. The container 10 is a container for pressure feed which contains a liquid and which can endure an internal pressure of up to 200 kPa. The container 10 includes a tubular main body portion 12, a cylindrical mouth 11 which is open at one end (upper end) of the main body portion 12, a stepped portion 13 which is continuous from the other end (lower end) of the main body portion 12, and a round bottom portion 15 which continuously extends away from the stepped portion 13 and bulges downward to have an approximately hemispherical shape. The internal space of the container 10 communicates with the outside through the cylindrical mouth 11. This opening and a lower end of an inner wall of the round bottom portion 15 face each other.

The main body portion 12 has an upper end portion 12a at which the cylindrical mouth 11 is open, a neck portion 12b which extends from its lower end, and a trunk portion 12c which extends further downward from a lower end of the neck portion 12b. The diameter of the trunk portion 12c decreases gradually toward the neck portion 12b. Also, external threads 12a1 and 12b1 protrude respectively from outer circumferential surfaces of the upper end portion 12a and the neck portion 12b.

The container 10 is made of a resin and is formed by direct blow molding. In the direct blow molding, a tubular resin material which is formed by extruding a molten resin at high temperature and is called parison is sandwiched in split molds having engraved desired shapes to be produced. In this state, a lower end of the parison is pinched off by the molds, whereby a pinched-off portion is formed. A portion where the parison has been pinched off becomes a bottom portion of the container. Subsequently, compressed air is fed into the parison through a blow pin.

As a result, the parison is bulged and pressed against the inner wall of the mold, whereby the container is formed. Parting lines PL, which are marks of the mating interface of the split molds, are formed continuously through the upper end portion 12a, the neck portion 12b, the trunk portion 12c, the stepped portion 13, and the round bottom portion 15.

Since the container 10 is a product formed by direct blow molding, the stepped portion 13, which is continuous with and directly adjacent to the round bottom portion 15, has a slightly larger thickness in the vicinity of the parting lines PL, as compared with wall thicknesses at other locations on the same circumference. This thicker portion contributes to increasing rigidity, thereby suppressing deformation of the container.

In the front view as shown in FIG. 1(a), in a region from a lower end of the main body portion 12 to the stepped portion 13, the concave portions 14 are recessed from an outer surface of the container 10 toward its center axis at four locations which are located on opposite sides of the parting lines PL and are symmetric with respect to the parting lines PL. The four concave portions 14 do not overlap with the parting lines PL and are formed at the stepped portion 13 to be arranged in a row in the circumferential direction of the container 10. Claw portions 21 of a support base 20, which will be described later, are engaged with the concave portions 14 (see FIG. 2). As a result, the container 10 and the support base 20 are coupled together, whereby the container 10 stands by itself. All of the four concave portions 14 have the same shape. Each concave portion 14 has an approximately elliptical shape; i.e., its length H along the circumferential direction of the main body portion 12 (circumferential direction length H) is greater than its length along the direction of the center axis of the main body portion 12 (namely, the direction of the center axis of the container 10) (center axis direction length V).

The center point h of the circumferential direction length H of each concave portion 14 is located an angle of θ away from the position of the boundary between the main body portion 12 and the stepped portion 13 on a corresponding parting lines PL. Namely, in a cross sectional view of the container 10 at the boundary between the main body portion 12 and the stepped portion 13, each of the four concave portions 14 is separated and deviated, by the smallest angle θ, from a reference line Y, which passes through the center axis C of the container 10 and connects the parting lines PL. In the example shown in FIG. 1(b), the angle θ is 30°.

Since the plurality of concave portions 14 are not connected in series and provided intermittently as described above, even when the internal pressure of the container 10 increases due to the pressure of the high-pressure gas which is introduced at the time of pressure feed of the liquid contained in the container 10, extension of the concave portions 14 in the direction of the center axis direction length V can be suppressed, and the engagement between the concave portions 14 and the claw portions 21 is maintained, so the support base 20 does not come off the container 10. Also, since the concave portions 14 do not extend due to high pressure, the container 10 does not extend in the direction of the center axis (the vertical direction in FIG. 1(a)), and the overall height of the container 10 hardly changes between the case where the internal pressure of the container 10 is normal pressure and the case where the internal pressure of the container 10 is high pressure. Since the container 10 can be applied to various types of liquid feeders which may or may not have container supports for suppressing deformation of containers, the container 10 has a high degree of versatility. As described above, according to the container 10 of the present invention, there do not arise a problem that, as in the case of a conventionally known container having a circumferential groove which is continuously concaved along the outer circumference of the container, the circumferential groove extends under high pressure and the support base comes off the container, and a problem that the overall height increases. In addition, the container 10 eliminates the necessity of container supports of the liquid feeder.

In the case where the container 10 has four concave portions 14, the above-described angle θ is preferably 20 to 45°, more preferably 20 to 40°, further preferably 20 to 30°, and most preferably 30°. Also, it is preferred that the plurality of angles θ are the same. When the angle θ falls within this range, the concave portions 14 can be disposed near the parting lines PL where the wall thickness is slightly larger and therefore deformation does not occur easily.

In the case where, as shown in FIG. 1(b), the four concave portions 14 are disposed in point symmetry with respect to the center axis C serving as a point of symmetry, in line symmetry with respect to the reference line Y serving as an axis, and/or in line symmetry with respect to the reference line X serving as an axis where the reference line X perpendicularly intersecting the reference line Y at the center axis C, since the high pressure at the time of pressure feed equally acts on each concave portion 14, extension of the container 10 can be suppressed more effectively. In addition, when the claw portions 21 of the support base 20 provided at positions corresponding to the concave portions 14 are engaged with the concave portions 14, the container 10 and the support base 20 can be coupled together by merely aligning a pair of the concave portion 14 and the claw portion 21 with each other.

The ratio of the sum total of the circumferential direction lengths H of the concave portions 14 to a largest peripheral length D of the main body portion 12 (the longest circumferential length of the outer circumference of the main body portion 12; see FIG. 2(a)); i.e., an occupancy ratio of the circumferential direction lengths H of the concave portions 14 to the largest peripheral length D of the main body portion 12, is represented by an expression of occupancy ratio=(H×N/D)×100, where N represents the number of the concave portions 14. This occupancy ratio is preferably 10 to 90%, more preferably 15 to 70%, and further preferably 20 to 50%. When the occupancy ratio falls within this range, it is possible to engage the claw portions 21 with the concave portions 14 infallibly, and to suppress extension of the concave portions 14 due to application of high pressure to the interior of the container 10. The circumferential direction length H is an outer circumferential length of the main body portion 12 which is missing due to presence of each concave portion 14.

The largest peripheral length of the main body portion 12 is determined based on the outer diameter of the main body portion 12, which is arbitrarily set in accordance with a required capacity of the container 10. The capacity of the container 10 is specifically 3 to 20 L, more specifically 3 to 10 L. The outer diameter of the main body portion 12 is set, for example, to 120 to 360 mm. Notably, no particular limitation is imposed on the center axis direction length V of the concave portions 14, and the center axis direction length V is set to 4 to 15 mm.

When the liquid is to be fed by means of pressure feed, a liquid feed pipe (not shown) is inserted from the cylindrical mouth 11 straight toward the round bottom portion 15, and its end is positioned such that a slight gap remains between the end and an inner wall surface of a top portion of the round bottom portion 15. As the liquid is discharged from the container 10 as a result of the pressure feed, the liquid remaining in the container 10 collects at the top portion of the round bottom portion 15 having an approximately hemispherical shape. Since the end of the liquid feed pipe is positioned in the vicinity of the top portion of the round bottom portion 15, the residual amount of the liquid can be reduced considerably.

Also, even when the internal pressure of the container 10 becomes high due to the high-pressure gas which is introduced into the container 10 at the time of pressure feed, since the bottom surface of the container 10 has an approximately hemispherical shape and therefore the pressure acting on the inner wall surface of the round bottom portion 15 is dispersed, deformation of the bottom surface is suppressed. The radius of curvature of the inner wall surface of the round bottom portion 15 is preferably 1 to 5 times a value obtained by dividing the largest peripheral length D by $2\pi$ (namely, the radius of the trunk portion 12c), more preferably 1 to 4 times the value, and further preferably 1 to 3 times the value.

FIG. 2(a) shows a perspective view of a container assembly 100 of the present invention, and FIG. 2(b) shows an exploded perspective view of the container assembly 100. The container assembly 100 is composed of the container 10, a support base 20, and a handle 30. Like the container 10, the support base 20 and the handle 30 are also made of a resin.

The support base 20 has a flat cylindrical shape as a whole and has an opening at its upper end. The support base 20 has an outer diameter equal to an outermost diameter of the main body portion 12 of the container 10. Around the opening of the support base 20, claw portions 21 are provided at positions corresponding to the concave portions 14. The claw portions 21 extend upward from a side wall portion of the support base 20. Each claw portion 21 is curved, in the shape of a hook, toward the center axis side of the support base 20. Since the support base 20 is made of a resin, the claw portions 21 have a slight degree of flexibility. Therefore, when the container 10 and the support base 20 are coupled together, the claw portions 21 come into contact with an upper end portion of the round bottom portion 15 and deflect so as to slightly expand outward from the side surface of the support base 20, and then are fitted into the recessed concave portions 14. Since the container 10 and the support base 20 are coupled together only by engagement between the claw portions 21 and the concave portions 14, they can be coupled and decoupled easily when necessary. Notably, the outer diameter of the support base 20 may be smaller than the outermost diameter of the main body portion 12.

The handle 30 has an annular portion 31 and an ear portion 32. The annular portion 31 has a ring-like shape, thereby forming a circular opening. The annular portion 31 is attached to the neck portion 12*b* of the container 10 in such a manner that it surrounds the neck portion 12*b*. The ear portion 32 extends from a portion of an outer circumference of the annular portion 31 in a radial direction of the annular portion 31. The annular portion 31 has an attachment hole 31*a* through which the neck portion 12*b* passes and an internal thread 31*b* provided on an inner wall surface of the annular portion 31. Meanwhile, the ear portion 32 has a circular opening as a finger engagement hole 32*a* into which a finger is inserted. Planes defined by the opening circles of the attachment hole 31*a* and the finger engagement hole 32*a* are located to be orthogonal to each other. The handle 30 is detachably attached to the container 10 as a result of screw engagement between the external thread 12*b*1 and the internal thread 31*b*. The handle 30 is attached to the container 10 when necessary. For example, when a worker carries the container assembly 100, the worker can insert his/her finger into the finger engagement hole 32*a*, and lift and carry the container assembly 100.

The handle 30 is not molded integrally with the container 10 and is separate from the container 10. Thus, the container 10 has a shape of point symmetry with respect to its center axis (excluding the external threads 12*a*1 and 12*b*1). As a result, when the container 10 is produced by direct blow molding, it is possible to prevent the container 10 from having uneven thickness (excluding the bottom portion 15 and a pinch-off portion formed in its vicinity), thereby effectively suppressing deformation at the time of pressure feed.

Figure 2:
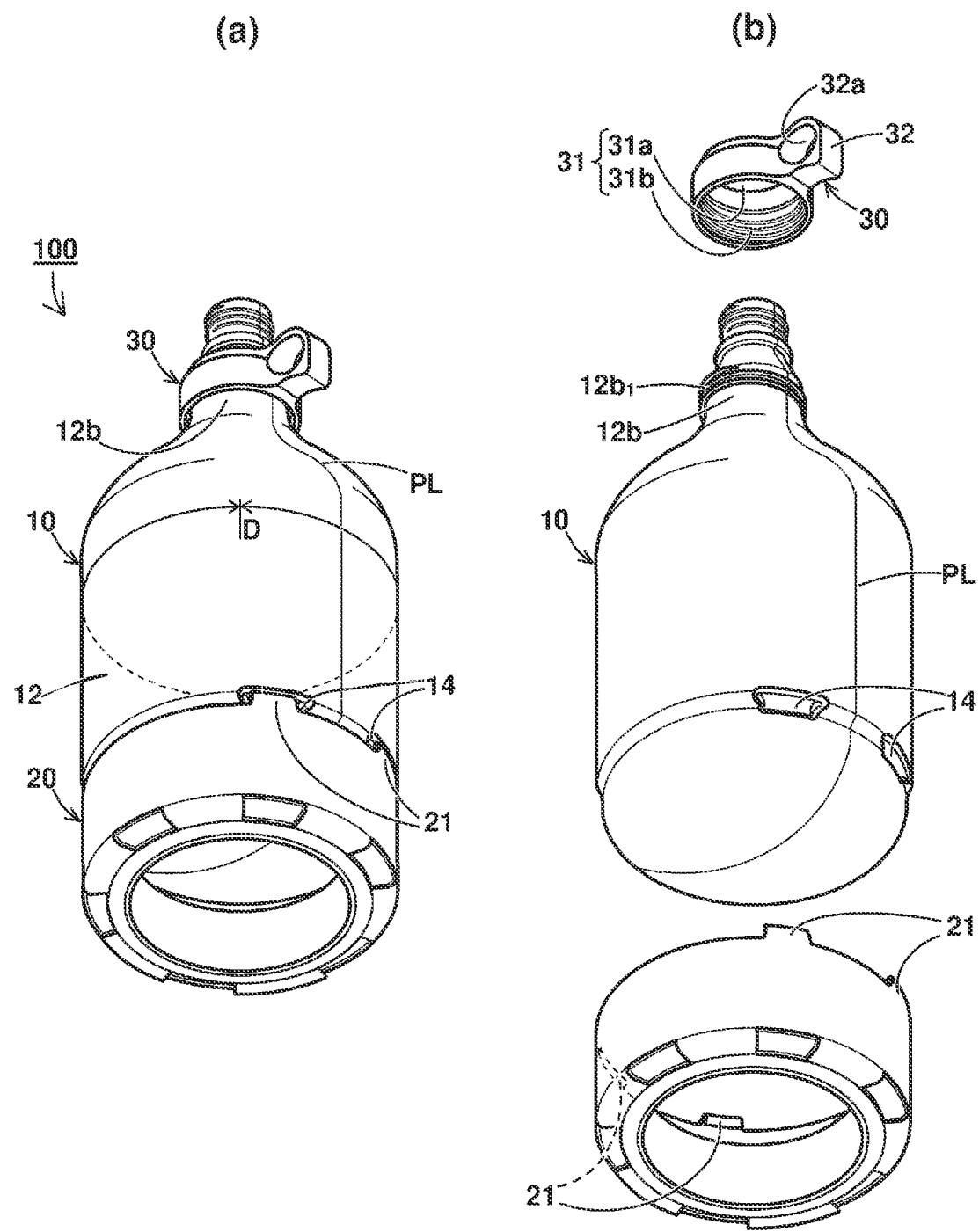
FIG. 2 shows a perspective view and an exploded perspective view of a container assembly to which the present invention is applied.
Figure 3:
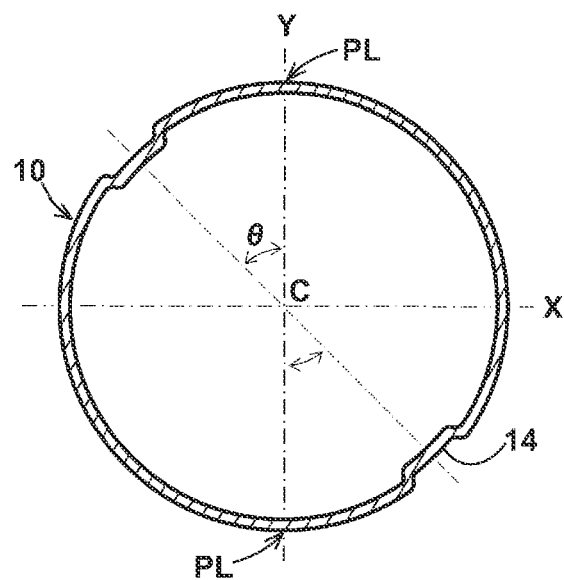
FIG. 3 is an end view showing a different example of the container to which the present invention is applied.
Figure 3:
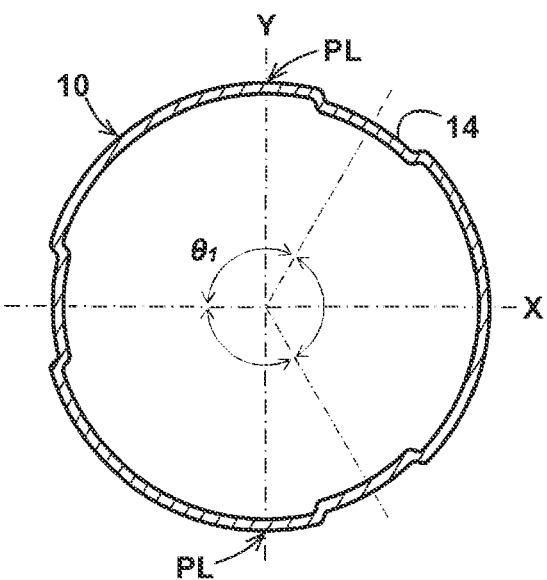
Figure 3:
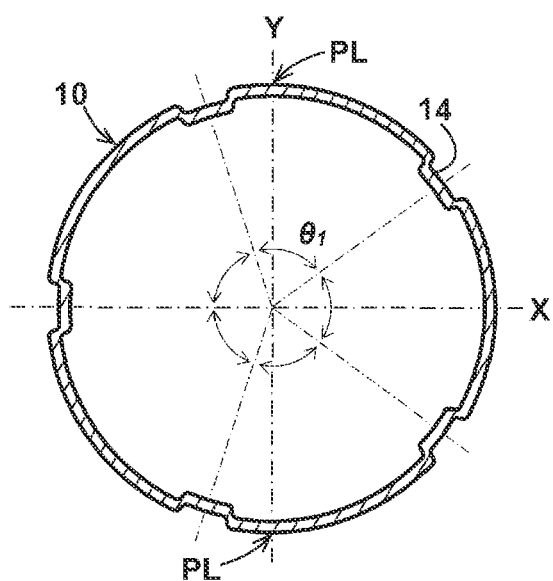
Figure 3:
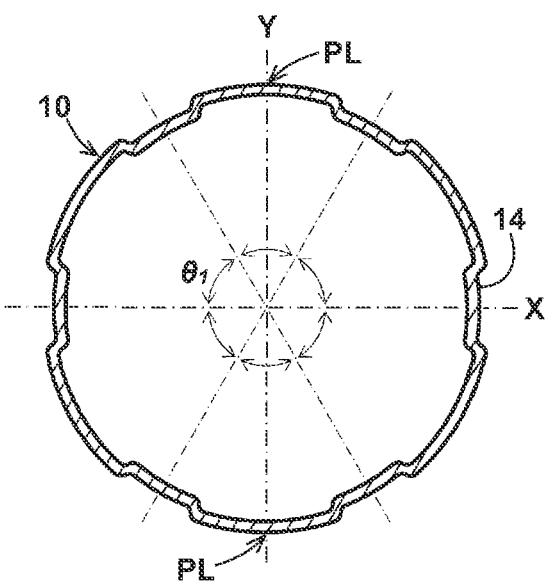

FIGS. 1 and 2 show the example in which the number of concave portions 14 is 4. However, no limitation is imposed on the number of the concave portions 14 so long as a plurality of concave portions 14 are formed. Specifically, the number of concave portions 14 may be 2 to 6. FIG. 3(*a*) shows an example in which the number of the concave portions 14 is 2. FIG. 3(*b*) shows an example in which the number of the concave portions 14 is 3. FIG. 3(*c*) shows an example in which the number of the concave portions 14 is 5. FIG. 3(*d*) shows an example in which the number of the concave portions 14 is 6. Each of these drawings is an end view which represents an end surface obtained in the same manner as in FIG. 1(*b*). Specifically, the end surface is obtained by cutting the container 10 at a position between the main body portion 12 and the stepped portion 13, and the obtained end surface is viewed in the direction toward the stepped portion 13.

The two concave portions 14 in FIG. 3(*a*) are provided at positions determined such that the positions are in point symmetry with respect to the center axis C of the container 10 serving as a point of symmetry and each position is an angle θ (=45°) away from a corresponding parting line PL at the boundary between the main body portion 12 and the stepped portion 13. The three concave portions 14 in FIG. 3(*b*) are provided at positions which are separated from one another by an angle θ1 (=120°) and which are symmetric with respect to the reference line X, which is perpendicular to the reference line Y. The concave portions 14 in FIG. 3(*c*) are provided at positions which are separated from one another by an angle $\theta_1$ (=72°) and which are symmetric with respect to the reference line X. The concave portions 14 in FIG. 3(*d*) are provided at positions which are separated from one another by an angle $\theta_1$ (=60°) and which are symmetric with respect to the reference lines X and Y. In each of the examples, the concave portions 14 are intermittently formed at equal intervals or at unequal intervals in the horizontal direction of the container 10 and do not overlap with the parting lines PL.

The material of the container 10 is a thermoplastic resin. The member which constitutes the container 10 may have a single-layer structure or a multilayer structure. In both the case where the container 10 has a single-layer structure and the case where the container 10 has a multilayer structure, the thermoplastic resin which constitutes the container 10 preferably has a flexural modulus of at least 700 MPa. In the case where the container 10 has a multilayer structure, it is sufficient that resin layers which form the multilayer structure have the above-described flexural modulus as a whole. The container 10 formed of a thermoplastic resin having a flexural modulus of at least 700 MPa enables pressure-feed of the liquid by using a gas having a pressure of up to 200 kPa, without causing breakage of the container or large deformation of the container. The flexural modulus can be determined in accordance with JIS K7171 (2016).

The greater the wall thickness of the container 10, the greater the degree to which the strength of the container can be enhanced. Meanwhile, when the wall thickness is excessively large, a large amount of a raw material is needed, and the container has an excessively large weight. In view of this, it is preferred that the container 10 has a smaller wall thickness so long as the container 10 can be molded by using a thermoplastic resin having a flexural modulus of at least 700 MPa and a required strength can be secured. For example, the wall thickness of the trunk portion 12*c* of the container 10 may be 0.8 to 4 mm.

The material of the container 10 may be a high-purity thermoplastic resin. In the case where the container 10 has a multilayer structure, it is sufficient that at least the material of its inner surface is a high-purity thermoplastic resin. The container 10 formed of a high-purity thermoplastic resin is suitable for containing a liquid required to have a high degree of cleanness, such as semiconductor materials, chemical solutions for manufacture of semiconductors, and food materials. The high-purity thermoplastic resin refers to a resin which does not cause leaching of impurity particulates into the liquid contained in the container 10 in an amount in excess of a predetermined reference value. Cleanness is known as an index representing this reference value. The cleanness shows the degree to which the quality of the liquid deteriorates as a result of leaching of impurity particulates into the liquid contained in the container for a long period of time. The cleanness can be obtained by storing ultrapure water or a photoresist liquid in a test container for a certain period of time and then counting the number of particulates present in a portion (1 mL) of the liquid stored in the container. Particulates whose particle sizes are 0.3, 0.2, 0.1, and/or 0.06 μm or greater are counted in accordance with a standard to be applied. Specifically, the cleanness is defined by the following mathematical expression (1).

[Mathematical expression 1]

$$\text{Cleanness (counts/mL)} = \frac{c(\text{counts}) \times a/2(\text{mL})}{b(\text{mL}) \times a(\text{mL})} \quad (1)$$

In Mathematical expression (1), "a" represents the capacity of the test container, and "b" represents the amount of liquid sampled from the test container. First, a liquid sample for measuring the initial cleanness is collected as follows. Into the test container having a capacity a (mL), ultrapure water or a photoresist liquid is poured in an amount which is half of the capacity of the test container; i.e., a/2 (mL). After shaking the test container for 15 seconds and leaving it for 24 hours, the ultrapure water or photoresist liquid is sampled as the liquid sample. A plug is attached to the container after measurement of the initial cleanness, and the container is allowed to stand for a certain period of time. Then, the container is rotated three times without generating bubbles. Subsequently, another liquid sample for measuring the cleanness after the ultrapure water or photoresist liquid having been stored is collected. The parameter "c" is a value representing the number of particulates contained in the entire sample liquid and counted by a particle counter. The initial cleanness and the cleanness after storage for the certain period of time are calculated from that numerical value in accordance with Expression (1). The smaller the numerical value of the cleanness, the smaller the degree to which the quality of the photoresist liquid has deteriorated. When the cleanness is smaller than 100 number/mL, it shows that the container has contained the photoresist liquid without deteriorating its quality. Such photoresist liquid does not lower the quality and yield of semiconductors or liquid crystal displays (LCD).

A resin which is determined to satisfy the condition that a container 10 formed of that resin and used as a test container have a predetermined cleanness is chosen as a high-purity thermoplastic resin for forming the container 10. In the case where the container 10 contains a photoresist liquid, a resin whose cleanness is smaller than 100 number/mL (one example of the predetermined reference value) is used. In other words, the high-purity thermoplastic resin is a resin which does not cause leaching of impurity particulates into the liquid in an amount in excess of the predetermined reference value. Alternatively, a resin whose cleanness is smaller than 200 number/mL may be used in accordance with a standard to be applied. Also, a resin whose cleanness is smaller than 50 number/mL, smaller than 10 number/mL, smaller than 5 number/mL, or smaller than 3 number/mL may be used. Notably, the plug (not shown) of the container is preferably formed of the high-purity thermoplastic resin.

Also, instead of the cleanness, the degree of lowering of transparency of liquid (another example of the predetermined reference value) may be used to define the degree of leaching of impurity particulates.

Examples of the resin used to from the container 10 include polyolefins such as polyethylene and polypropylene, polyamide, polyvinyl alcohol, poly (ethylene-co-vinyl alcohol), polyester, and polyphenylene oxide. One or more of these resins may be used to form a single-layer container, and a plurality of these resins may be used to form a multilayer container. Among them, polyethylene is preferred. Specific examples include linear polyethylene (LLDPE) and high-density polyethylene (HDPE), which are copolymers of ethylene and α-olefin. From the viewpoint of rigidity and cleanness, it is preferable to form the container 10 with high-density polyethylene. From the viewpoint of environmental protection, it is preferable to use a resin that can be recycled as a material.

The melt flow rate of high-density polyethylene is preferably 0.01 to 3.0 g/10 minutes, more preferably 0.05 to 2.0 g/10 minutes. The density of high-density polyethylene is preferably 0.940 to 0.970 g/cm$^3$, more preferably 0.950 to 0.960 g/cm$^3$. The melt flow rate can be determined in accordance with JIS K6760 (1995).

At least the inner wall surface of the container 10 may be made of a polyethylene or ethylene α-olefin copolymer resin having a density of 0.940 to 0.970 g/cm$^3$. This resin is preferred such that the weight average molecular weight measured by gel permeation chromatography is $10 \times 10^4$ to $30 \times 10^4$, the amount of polymer having a molecular weight of $1 \times 10^3$ or less is less than 2.5% by mass, and the amounts of a neutralizer, an antioxidant, and a light stabilizer, which are quantified by liquid chromatography, are 0.01% by mass or less. Here, the α-olefin may be at least one selected from the group consisting of propylene, butene-1, 4-methyl-pentene-1, hexene-1, and octene-1. Use of such a resin enables production of a container 10 which exhibits high mechanical strength and is excellent in handling and in which leaching of impurity particulates into the contained liquid is considerably suppressed.

The material of the container 10 may be a resin composition which includes a polyethylene or ethylene/α-olefin copolymer resin having a density of 0.940 to 0.970 g/cm$^3$; a neutralizer, an antioxidant, and a light stabilizer; a light blocking pigment containing an inorganic pigment and/or an organic pigment; and a dispersant which is an olefin polymer having a number average molecular weight of $2 \times 10^3$ or more. This resin preferably has a weight average molecular weight of $10 \times 10^4$ to $30 \times 10^4$ measured by gel permeation chromatography, and the amount of polymer having a molecular weight of $1 \times 10^3$ or less is less than 5% by mass. The amounts of the neutralizer, antioxidant, and light stabilizer in the resin composition are preferably 0.01% by mass or less, respectively. At least one selected from titanium oxide, carbon black, and red iron oxide are used as the above-described inorganic pigment. At least one selected from phthalocyanine-type, quinacridone-type, and azo-type organic pigments are used as the above-described organic pigment. The amount of the light blocking pigment in the resin composition is preferably 0.01 to 5% by mass. The amount of the dispersant of the olefin-based polymer is preferably less than 5% by mass. Use of such a resin composition enables obtainment of a container 10 which exhibits high mechanical strength and is excellent in handling, in which leaching of impurity particulates into the contained liquid is considerably suppressed, and which can prevent deterioration of the liquid caused by light. Such container 10 is suitably used for storing a chemical solution for manufacture of semiconductors or the above-mentioned solvent for production of pharmaceuticals.

The container 10 may have a layer structure having an inner layer, an intermediate layer, and an outer layer. In this case, the inner layer is preferably formed of a high-purity resin which includes at least one of an olefin polymer (e.g., ethylene, propylene, butene-1, 4-methyl-pentene-1, hexene-1, or octene-1) and a copolymer composed of ethylene and olefin other than ethylene; and a neutralizer, an antioxidant, and a light stabilizer. In this case, the amounts of the neutralizer, the antioxidant, and the light stabilizer are preferably 0.01% by mass at a maximum, respectively. The intermediate layer preferably contains a solvent barrier resin containing poly(ethylene-co-vinyl alcohol). Further, an adhesive resin layer formed of maleic acid modified polyethylene or the like may be provided between the inner layer and the intermediate layer and/or between the intermediate layer and the outer layer. The outer layer preferably includes a resin composition containing a light-blocking substance. This resin composition may contain a pigment dispersant in an amount of less than 5% by mass and a light-blocking pigment in an amount of 0.01 to 5% by weight. The pigment dispersant is made of an olefin-based polymer such as polyethylene and polypropylene having a number average molecular weight of $2 \times 10^3$ or more. The light-blocking pigment contains an inorganic pigment and/or an organic pigment. This resin composition may also contain an UV absorber in an amount of less than 2.5% by weight. According to such a layer structure, since particulates and metal ions do not leach from the container 10 during storage and transportation of the liquid, the quality of the high-purity liquid can be maintained, and the container 10 that is difficult to break and lightweight is obtained.

No particular limitation is imposed on the materials of the support base 20 and the handle 30, and the materials may be the same or different from the material of the container 10. Examples of the materials include a homopolymer and/or a copolymer and/or a polymer blend, each of which includes at least one of the group consisting of low-density polyethylene, medium-density polyethylene, high-density polyethylene, linear low-density polyethylene, polypropylene, polybutene, polystyrene, polyvinyl acetate, poly(methyl methacrylate), poly(ethyl methacrylate), poly(acrylic acid), cyclic polyolefin, polyacrylonitrile, polyamide (nylon), polyesters such as polyethylene terephthalate and polybutylene terephthalate, polyurethane, polycarbonate, polyimide, polyphenylene sulfide, and poly(vinyl chloride).

As a method for manufacturing the container 10, direct blow molding (extrusion blow molding) is mentioned, but instead of this, known blow molding such as injection blow molding, multilayer extrusion blow molding, and stretch blow molding may be employed. The method for manufacturing the support base 20 and the handle 30 is preferably injection molding.

Examples of the liquid contained in the container 10 include liquid chemicals such as methanol, ethanol, isopropanol, isobutanol, ethylene glycol, acetone, ethyl acetate, toluene, dimethylformamide, ethylene glycol acetate, methoxypropyl acetate, and butyl cellosolve; chemical solutions for manufacture of semiconductors and liquid crystal devices such as photoresist liquids and cleaning agents; medical and pharmaceutical solutions such as disinfectants, infusions, dialysates, and formulation raw materials; and chemical solutions for food industry such as flavorings, concentrates, and food additives.

DESCRIPTION OF EMBODIMENT

The present invention will now be described specifically by referring to examples. However, the present invention is not limited to these examples.

Example 1

High-density polyethylene resin (melt flow rate: 0.3 g/10 min, density: 0.951 g/cm$^3$, flexural modulus: 1370 MPa), serving as the material of the container 10, was hot-melted and extruded by an extruder to form a parison. The parison was sandwiched in a two-part mold and direct blow molding was performed, thereby fabricating a container 10 of Example 1. The container 10 had four concave portions 14. Each of the four concave portions 14 had a circumferential direction length H of 25 mm and a center axis direction length V of 6 mm and was 30° away from the position of the boundary between the main body portion 12 and the stepped portion 13 on the corresponding parting line PL. The largest peripheral length D of the main body portion 12 was is 160π mm, and the proportion of the circumferential direction lengths H of the four concave portions 14 to the largest peripheral length D, i.e. the occupancy ratio (H×N/D×100), was 20%.

The support base 20 and the handle 30 were fabricated by injection molding using linear low-density polyethylene resin (melt flow rate: 4.0 g/10 min, density: 0.938 g/cm$^3$). The support base 20 was coupled to the container 10, and the handle 30 was attached to the container 10 by screwing, thereby fabricating the container assembly 100.

Measurement of Shape Change at High Pressure

The length of the container 10 from the upper end of the main body portion 12 to the lower end of the round bottom portion 15 was measured, as the overall height of the container 10 at normal pressure, by using a height gauge (manufactured by Mitutoyo Co., Ltd.). A pressurization device was attached to the cylindrical mouth 11 and the upper end portion 12a, and the internal pressure of the container 10 was increased to 200 kPa, which was kept constant for 1 hour. After 1 hour, the overall height of the container 10 was measured again and recorded as the overall height at high pressure. The ratio of the overall height at high pressure to the overall height of container 10 at normal pressure was obtained as an overall height change ratio. The obtained overall height change ratio was 0.61%.

Measurement of Amount of Residual Liquid

Tap water (2 L) was stored in the container 10, and a liquid feed pipe (not shown) was inserted straight from the cylindrical mouth 11 into the container 10 and was fixed such that its end was located near the inner wall surface of the round bottom portion 15. Tap water was discharged from the container 10 by applying a pressure of 0.05 MPa to the interior of the container 10. The application of the pressure was stopped when tap water no longer came out of the liquid feed pipe, and the amount of tap water remaining in the container 10 was measured. The measured amount was 0.3 mL.

Example 2

A container 10 of Example 2 was fabricated by performing the same process as in Example 1 except that the circumferential direction length H of each concave portion 14 was changed to 35 mm and the occupancy ratio of the four concave portions 14 was changed to 28%. Also, the support base 20 and the handle 30 were fabricated in the same manner as in Example 1. The support base 20 was coupled to the container 10, and the handle 30 was attached to the container 10 by screwing, thereby fabricating the container assembly 100. For the container 10, a shape change at high pressure was measured by preforming the same operation as in Example 1 and the overall height change ratio was obtained. The obtained overall height change ratio was 0.69%.

Example 3

A container 10 of Example 3 was fabricated by performing the same process as in Example 1 except that six concave portions 14 was formed at 60° intervals such that the concave portions 14 were separated from one another by 60° and their occupancy ratio was changed to 30%. Also, the support base 20 and the handle 30 were fabricated in the same manner as in Example 1. The support base 20 was coupled to the container 10, and the handle 30 was attached to the container 10 by screwing, thereby fabricating the container assembly 100. For the container 10, a shape change at high pressure was measured by preforming the same operation as in Example 1 and the overall height change ratio was obtained. The obtained overall height change ratio was 0.69%.

Example 4

A container 10 of Example 4 was fabricated by performing the same process as in Example 3 except that the circumferential direction length H of each concave portion 14 was changed to 35 mm and the occupancy ratio of the six concave portions 14 was changed to 42%. Also, the support base 20 and the handle 30 were fabricated in the same manner as in Example 1. The support base 20 was coupled to the container 10, and the handle 30 was attached to the container 10 by screwing, thereby fabricating the container assembly 100. For the container 10, a shape change at high pressure was measured by preforming the same operation as in Example 1 and the overall height change ratio was obtained. The obtained overall height change ratio was 0.86%.

Example 5

A container 10 of Example 5 was fabricated by performing the same process as in Example 3 except that the largest peripheral length D was change to 360 πmm, the circumferential direction length H of each concave portion 14 was changed to 50 mm, thereby changing the occupancy ratio of the six concave portions 14 to 27%, and the center axis direction length V was changed to 10 mm. Also, the support base 20 and the handle 30 were fabricated in the same manner as in Example 1. The support base 20 was coupled to the container 10, and the handle 30 was attached to the container 10 by screwing, thereby fabricating the container assembly 100. For the container 10, a shape change at high pressure was measured by preforming the same operation as in Example 1 and the overall height change ratio was obtained. The obtained overall height change ratio was 1.03%. Also, the amount of residual liquid measured by performing the same operation as Example 1 was 0.6 mL.

Comparative Example 1

Figure 4:
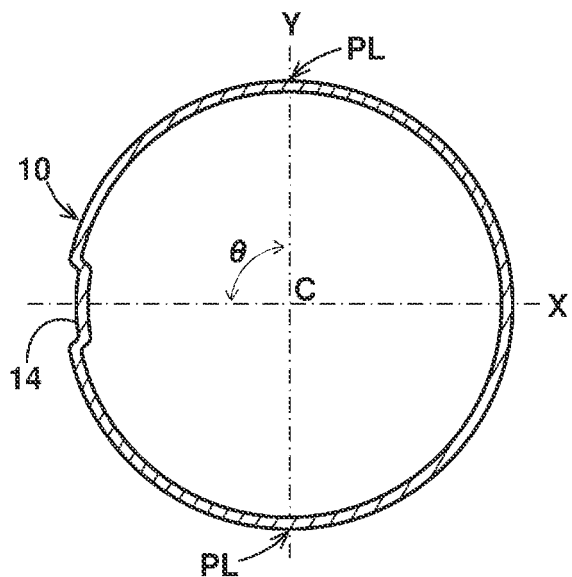
FIG. 4 shows an end view of a container of Comparative Example 1 which falls outside the scope of the present invention.

A container 10 of Comparative Example 1 was fabricated by performing the same process as in Example 1 except that, as shown in FIG. 4, a singe concave portion 14 was disposed to be located an angle θ (=90°) away from the position of the boundary between the main body portion 12 and the stepped portion 13 on a parting line PL, and the occupancy ratio of the single concave portion 14 was changed to 5%. Also, the support base 20 and the handle 30 were fabricated in the same manner as in Example 1. The support base 20 was coupled to the container 10, and the handle 30 was attached to the container 10 by screwing, thereby fabricating the container assembly 100. When the internal pressure of the container 10 was increased to 200 kPa by performing the same operation as in Example 1, the support base 20 came off the container 10. Therefore, the overall height change ratio was not measured.

Comparative Example 2

Figure 5:
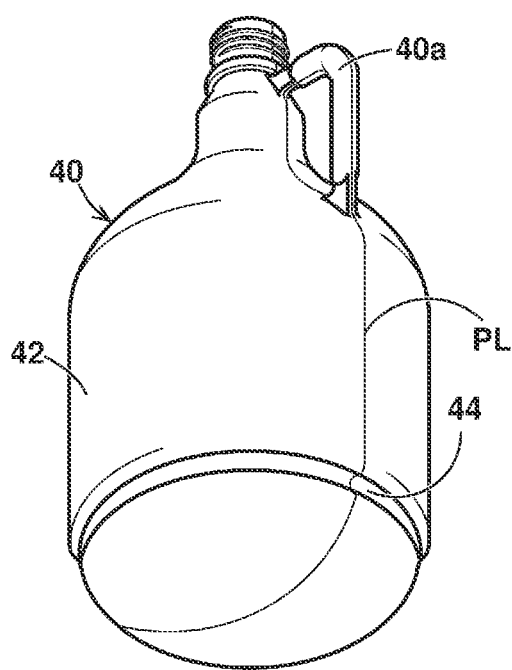
FIG. 5 shows perspective views of containers of Comparative Examples 2 and 4 which fall outside the scope of the present invention.
Figure 5:
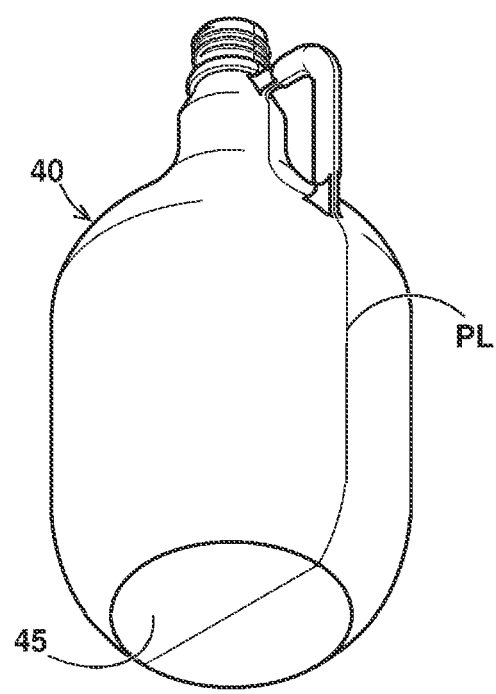

As shown in FIG. 5(a), a container 40 of Comparative Example 2 was fabricated by performing the same process as in Example 1 except that, instead of the concave portions 14, a circumferential groove 44 is provided over the entire circumference of a lower end of the main body portion 42, thereby changing the occupancy ratio of the circumferential groove 44 to 100%, and the container 40 and a handle 40a were molded integrally. A support base 20 fabricated by performing the same process as in Example 1 was coupled to the container 40, thereby fabricating the container assembly 100. For the container 40, a shape change at high pressure was measured by preforming the same operation as in Example 1 and the overall height change ratio was obtained. The obtained overall height change ratio was 5.11%. Also, the amount of residual liquid measured by performing the same operation as Example 1 was 2.2 mL.

Comparative Example 3

A container 40 of Comparative Example 3 was fabricated by performing the same process as in Comparative Example 2 except that the largest peripheral length D was change to 360π mm. A support base 20 fabricated by performing the same process as in Comparative Example 2 was coupled to the container 40, thereby fabricating the container assembly 100. For the container 40, a shape change at high pressure was measured by preforming the same operation as in Example 1 and the overall height change ratio was obtained. The obtained overall height change ratio was 7.37%.

Comparative Example 4

A container 40 of Comparative Example 4 capable of standing by itself without use of a support base was fabricated by performing the same process as in Comparative Example 2 except that, as shown in FIG. 5(b), the concave portions 14 were not provided and a flat bottom portion 45 was formed instead of the round bottom portion 15. When the internal pressure of the container 40 was increased to 200 kPa by performing the same operation as in Example 1, the flat bottom portion 45 bulged and the container 40 fell over. The overall height change ratio of the fallen-over container 40 was obtained. The obtained overall height change ratio was 4.10%.

Table 1 collectively shows the configurations of the containers 10 of Examples 1 to 5 and the containers of Comparative Examples 1 to 4 and also shows the results of measurement of their shape changes at high pressure and measurement of their residual liquid amounts.

TABLE 1

|  |  | Examples | | | | | Comparative Examples | | | |
| --- | --- | --- | --- | --- | --- | --- | --- | --- | --- | --- |
|  |  | 1 | 2 | 3 | 4 | 5 | 1 | 2 | 3 | 4 |
| Largest peripheral length D (mm) | | 160π | 160π | 160π | 160π | 360π | 160π | 160π | 360π | 160π |
| Concave portions | Number | 4 | 4 | 6 | 6 | 6 | 1 | Entire circumference | Entire circumference | 0 |
|  | Position | Each 30° from PL | Each 30° from PL | 60° intervals | 60° intervals | 60° intervals | 90° from PL | — | — | — |
|  | Circumferential direction length H (mm) | 25 | 35 | 25 | 35 | 50 | 25 | — | — | — |
|  | Center axis direction length V (mm) | 6 | 6 | 6 | 6 | 10 | 6 | 6 | 6 | — |
|  | Occupancy ratio of concave portions (%) | 20 | 28 | 30 | 42 | 27 | 5 | 100 | 100 | — |
| Handle | | Attached by screwing | Attached by screwing | Attached by screwing | Attached by screwing | Attached by screwing | Attached by screwing | Integral molding | Integral molding | Integral molding |
| Overall height change ratio (%) | | 0.6 | 0.69 | 0.69 | 0.86 | 1.03 | Not measured because of coming off of support base | 5.11 | 7.37 | 4.10 |
| Residual liquid amount (mL) | | 0.3 | — | — | — | 0.6 | — | 2.2 | — | — |

As can be understood from Table 1, in each of the containers 10 of Examples 1 to 5, the concave portions 14 did not extend. Therefore, even when the internal pressure of each container 10 was high, its overall height hardly changed although container supports for suppressing a change in the overall height of the container 10 were not used. Meanwhile, in the case of Comparative Example 1, since the container 10 had only one concave portion 14, the engagement between the container 10 and the support base 20 was instable, and therefore, the container 10 came off the support base 20. In the case of Comparative Examples 2 and 3 in which, instead of the concave portions 14, the circumferential groove 44 was continuously provided over the entire circumference of the container 40, the overall height of the container increased considerably, because the circumferential groove 44 extended in the manner of a helical spring as a result of an increase in the internal pressure of the container 40.

INDUSTRIAL APPLICABILITY

The container and the container assembly of the present invention are suitably used for pressure feed of liquids, for example, in the field of foods, in the field of pharmaceuticals, and in the field of manufacture of semiconductors and liquid crystal devices, in which clean liquids are demanded.

EXPLANATIONS OF LETTERS OR NUMERALS

10: container, 11: cylindrical mouth, 12: main body portion, 12a: upper end portion, 12a1: external thread, 12b: neck portion, 12b1: external thread, 12c: trunk portion, 13: stepped portion, 14: concave portion, 15: round bottom portion, 20: support base, 21: claw portion, 30: handle, 31: annular portion, 31a: attachment hole, 31b: internal thread, 32: ear portion, 32a: finger engagement hole. 40: container. 40a: handle. 42: main body portion. 44: circumferential groove. 45: flat bottom portion. 100: container assembly. C: center axis. D: largest peripheral length. H: circumferential direction length, h: center point. PL: parting line. V: center axis direction length. X and Y: reference lines, and θ and $\theta_1$: angles

What is claimed is:

1. A container used to contain a liquid and to pressure-feed the liquid, comprising an approximately cylindrical main body portion, a cylindrical mouth opening at one end of the main body portion, a stepped portion continuously extending from the other end of the main body portion and having a reduced diameter, and a round bottom portion continuously extending from the stepped portion and bulging away from the stepped portion, the container wherein
   a plurality of concave portions for engagement with claw portions of a support base which enables the container to stand by itself are intermittently formed at the stepped portion, the concave portions being recessed at positions which do not overlap with a series of parting lines extending through the main body portion, the stepped portion, and the round bottom portion; and
   each of the concave portions has an approximately elliptical shape elongated in a circumferential direction of the main body portion, and the total length of the plurality of concave portions in the circumferential direction accounts for 20 to 50% of a largest peripheral length of the main body portion.

2. The container according to claim 1, wherein the concave portions are provided, symmetrically with respect to the parting lines, at four locations each being an angle of 20 to 45° away from the corresponding parting line or at six locations separated from one another by an angle of 60°, the angles being those about a center axis of the main body portion.

3. A container assembly wherein the main body portion of the container according to claim 1 has a trunk portion and a neck portion which is located closer to the cylindrical mouth and whose diameter is smaller than that of the trunk portion, and a handle is fitted and/or screwed onto an outer surface of the neck portion.

4. A container assembly comprising the container according to claim 1 and a support base which has an opening into which the round bottom portion is fitted and claw portions which extend from a circumferential edge of the opening and are engaged with the concave portions, whereby the support base enables the container to stand by itself.

5. A container assembly wherein the main body portion of the container according to claim 2 has a trunk portion and a neck portion which is located closer to the cylindrical mouth and whose diameter is smaller than that of the trunk portion, and a handle is fitted and/or screwed onto an outer surface of the neck portion.

6. A container assembly comprising the container according to claim 2 and a support base which has an opening into which the round bottom portion is fitted and claw portions which extend from a circumferential edge of the opening and are engaged with the concave portions, whereby the support base enables the container to stand by itself.

* * * * *